Figure 1:
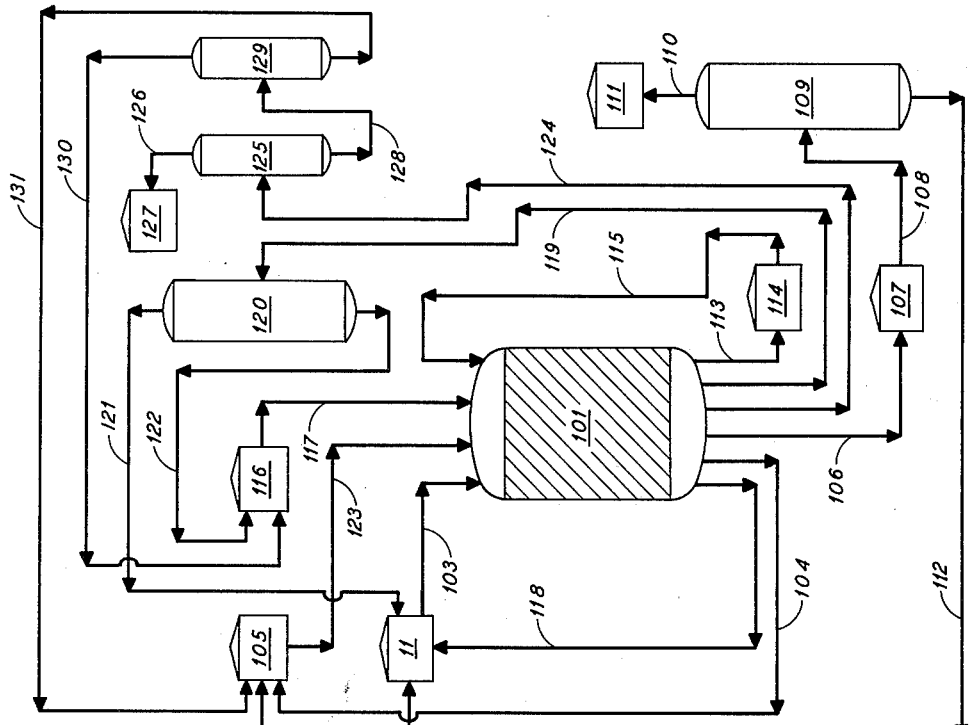
Figure 1:
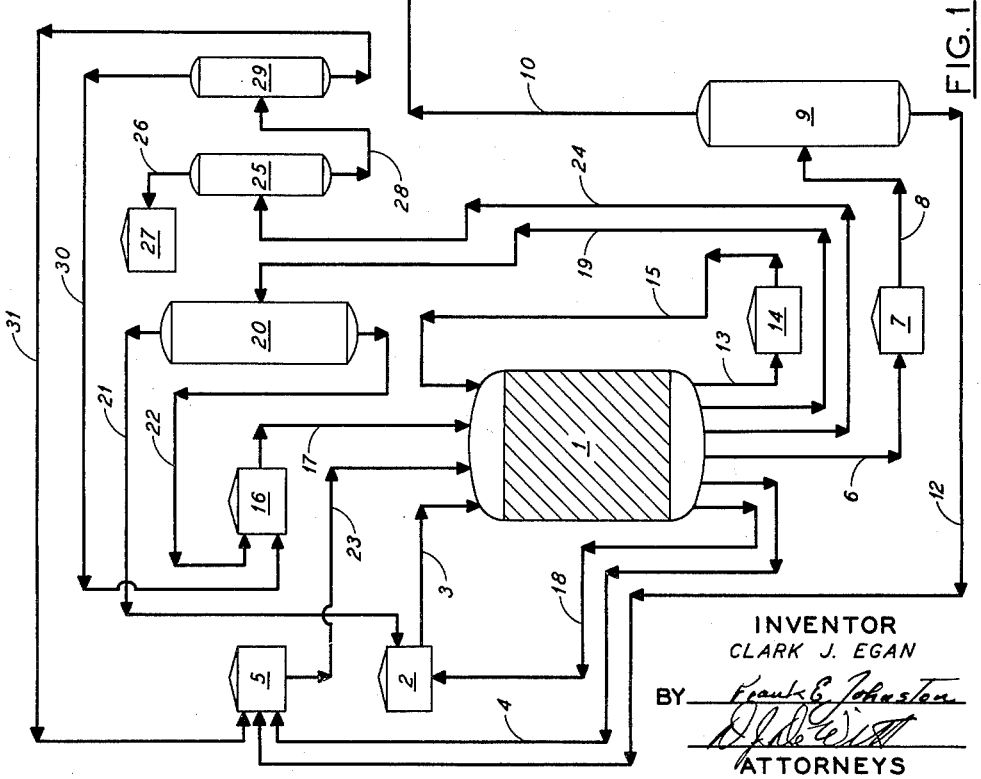

Sept. 18, 1962　　　　　　　C. J. EGAN　　　　　　　3,054,838
METHOD FOR SEPARATING N-HYDROCARBONS USING MOLECULAR SIEVES
Filed Sept. 8, 1958　　　　　　　　　　　　　　　　4 Sheets-Sheet 1

INVENTOR
CLARK J. EGAN
BY
ATTORNEYS

Sept. 18, 1962  C. J. EGAN  3,054,838
METHOD FOR SEPARATING N-HYDROCARBONS USING MOLECULAR SIEVES
Filed Sept. 8, 1958  4 Sheets-Sheet 2

INVENTOR
CLARK J. EGAN
BY
ATTORNEYS

United States Patent Office 3,054,838
Patented Sept. 18, 1962

3,054,838
METHOD FOR SEPARATING N-HYDROCARBONS USING MOLECULAR SIEVES
Clark J. Egan, Piedmont, Calif., assignor to California Research Corporation, San Francisco, Calif., a corporation of Delaware
Filed Sept. 8, 1958, Ser. No. 759,488
6 Claims. (Cl. 260—676)

This invention relates to a method for segregating normal alkanes and normal alkenes from mixtures thereof with various branched chain, alicyclic and aromatic hydrocarbons. It is particularly useful for improving the octane number of gasolines by separating their n-paraffin components, and for providing n-paraffins and n-olefins, alone or admixed, for subsequent processing.

It is known that many crystalline adsorbent aluminum silicates of either natural or synthetic origin, and including zeolites, have the property of selectively adsorbing hydrocarbons as a function of the molecular size and shape of the hydrocarbon molecule, such materials, along with others of this general character, being known in the art and referred to herein as "molecular sieve" adsorbents. For example, dehydrated chabazite $(Ca,Na_2)Al_2Si_4O_{12}$, will selectively adsorb straight chain hydrocarbons and exclude all branched or isoparaffins and all disc-shaped molecules such as the alicyclic and aromatic hydrocarbons. Thus, it is possible to employ molecular sieve material of suitable pore size to separate n-heptane from toluene and isooctane, n-octane from toluene and cyclohexane, n-hexane from isohexane and cyclohexane, and n-pentane from cyclopentane.

As discussed in Patent No. 2,306,610, issued December 29, 1942, to Barrer, aluminum silicates useful for adsorption separation of straight chain hydrocarbons have their atoms arranged in a definite crystalline pattern which contains pores or channels of precisely uniform size. The essential requirement for sorption to occur is that the pore size of the aluminum silicate in question must be larger than the diameter of the straight chain hydrocarbon molecule at its widest point, but smaller than the diameter of the molecule from which the straight chain hydrocarbon is to be separated. The length of the molecule and its molecular volume are of only secondary importance. For example, a molecular sieve with channels 4 Angstroms in diameter will admit methane and ethane but not propane and higher molecular weight straight chain hydrocarbons, branched hydrocarbons or molecules of disc-shaped hydrocarbons such as naphthenes and aromatics. On the other hand, a molecular sieve with channels of from about 4.5 to 5.5 Angstroms in diameter will admit all straight chain hydrocarbons irrespective of the number of carbon atoms in the chain, but will exclude all branched hydrocarbons since the latter have a critical dimension of about 5.58 Angstroms. Further, a 5 Angstrom sieve will exclude all disc-shaped molecules such as naphthenes and aromatics since these have critical dimensions of the order of 6 Angstroms or greater.

The foregoing mechanism of adsorption is in contrast with that encountered with the equilibrium separation which prevails when an adsorbent such as silica gel, alumina or activated charcoal is employed, for here the gel pores are large relative to all of the foregoing classes of molecules. Thus, when employing silica gel, the ability of the gel to adsorb aromatic compounds selectively from their mixtures with paraffin compounds is dependent primarily on factors other than the relative sizes of the various molecules, and no effect of molecular size is ordinarily encountered. Molecular sieves, on the other hand, mechanically block out all molecules with critical diameters greater than the characteristic pore diameter of the selected crystal structure, and thus all adsorption effects in molecular sieves which are dependent on factors other than molecular size can be exhibited only in connection with molecules having critical diameters smaller than the characteristic pore diameter of the selected crystal structure.

With regard to the relative adsorption under equilibrium conditions of mixtures of compounds of the same general class (for example, straight chain hydrocarbons or aromatics), the components of greater molecular weight will usually be preferentially adsorbed. For example, on a conventional adsorbent such as silica gel, aromatics are selectively sorbed at equilibrium in the order:

xylene>toluene>benzene while with n-paraffins on activated charcoal a representative order is $C_6H_{14}>C_5H_{12}>C_4H_{10}$, etc.

The aforementioned Barrer patent teaches that even in liquid phase operations this same order holds true under equilibrium conditions when dealing with molecular sieves, though it is noted in said patent that the velocity of adsorption of normal hydrocarbons decreases with increasing molecular weight, which is a different phenomenon altogether.

When molecular sieve types of adsorbents are employed to separate straight chain hydrocarbons from mixtures thereof with other types of hydrocarbons, the practice has been, once the sieve is saturated with respect to the straight chain component, to desorb the straight chain hydrocarbon in the vapor phase by passing a gas such as nitrogen or flue gas over the adsorbent at a relatively high temperature. While this procedure is satisfactory for laboratory or small-scale operations, it is undesirable for commercial operations because of the difficulties and added expense encountered in alternate heating of the adsorbent to bring it to the temperature required for desorption and thereafter cooling the material to begin the next adsorption cycle. While liquid phase desorption is practiced in the case of silica gel and similar types of conventional adsorbents, such liquid phase desorption has heretofore not been practiced with molecular sieve materials and has been deemed impractical of use therewith.

It is an object of this invention to overcome the deficiencies of the prior art methods and to provide an economical method for separating straight chain hydrocarbons (including normal alkenes and normal alkanes) from mixtures thereof with each other and/or with non-straight chain hydrocarbons, by the practice of a process utilizing a molecular sieve type of adsorbing medium. A further object is to provide a method of this character wherein both adsorption and desorption are effected in the liquid phase. A particular object is to provide such a liquid phase method which is well adapted for use in separating straight chain paraffins from gasolines, since n-paraffins are well known to be very low in octane number and therefore, adversely affect the properties of gasoline fuels for use in reciprocating engines. A further particular object is to provide such a liquid phase method which is well adapted for use in separating straight chain olefins from thermally or catalytically cracked stocks, for use in the manufacture of normal alcohols, alkylated benzene sulfonates, and the like.

In pursuance of the foregoing objectives, it has been discovered that, contrary to the teaching of the prior art, lower molecular weight normal alkanes are more highly retained at equilibrium than higher molecular weight normal alkanes, and lower molecular weight normal alkenes are more highly retained at equilibrium than higher molecular weight alkanes, when in the liquid state and in contact with molecular sieve type adsorbents which are adapted to receive them. Recognition of this property that a lower molecular weight straight chain hydrocarbon is more highly retained than a higher molecular weight hydrocarbon having the same degree of unsaturation per molecule, is basic to the process of the present invention, which consists of an improved and novel process for separation of hydrocarbons in the liquid state.

The equilibrium properties of the normal hydrocarbons are illustrated by the following examples:

EXAMPLE I

In these experiments, an amount of a binary hydrocarbon liquid of known composition, just sufficient to cover the adsorbent, was added to a flask containing a sample of Linde Type 5A (5 Angstroms) molecular sieve, a synthetic aluminum silicate produced by the Linde Air Products Company. The supernatant liquid was analyzed by refractive index or mass spectrometry, and the composition of the adsorbed liquid was determined by material balance. Equilibrium was assured by allowing the flask and contents to stand until there was substantially no further change in composition of the supernatent liquid.

*Table 1*

| System | 1 | 2 | 3 | 4 | 5 | 6 |
|---|---|---|---|---|---|---|
| | $nC_7H_{16}$ $nC_{12}H_{26}$ | $nC_7H_{16}$ $nC_{10}H_{23}$ | $nC_{10}H_{20}$ $nC_{16}H_{32}$ | $nC_7H_{16}$ $nC_{12}H_{24-1}$ | $nC_{16}H_{32-1}$ $nC_{16}H_{34}$ | $nC_5H_{10-2}$ $nC_5H_{12}$ |
| | Linde 5A molecular sieve | | | | | |
| Adsorbent Temp., °F | 190 | 70 | 70 | 70 | 70 | 70 |

VOLUME FRACTION OF LOWER MOLECULAR WEIGHT COMPONENT

| In Equilib. Liquid | In adsorbed phase | | | | | |
|---|---|---|---|---|---|---|
| 0 | 0 | 0 | 0 | 0 | 0 | 0 |
| 0.20 | 0.52 | 0.41 | 0.73 | 0.34 | 0.71 | 0.63 |
| 0.40 | 0.75 | 0.67 | 0.85 | 0.57 | 0.83 | 0.76 |
| 0.60 | 0.87 | 0.84 | 0.94 | 0.72 | 0.90 | 0.85 |
| 0.80 | 0.95 | 0.93 | 0.98 | 0.86 | 0.96 | 0.93 |
| 1.00 | 1.00 | 1.00 | 1.00 | 1.00 | 1.00 | 1.00 |

It will be noted from columns 1 and 2 of Table 1 that lower molecular weight normal paraffins are more highly retained at equilibrium than higher molecular weight paraffins, and from column 3 that lower molecular weight olefins are more highly retained than higher molecular weight olefins. Columns 5 and 6 show that olefins are more highly retained than paraffins of the same number of carbon atoms, and column 4 that a low molecular weight normal paraffin is selectively sorbed in the presence of a higher molecular weight normal olefin, although the degree of selectivity is not as great in this case as in systems which are either completely paraffinic or completely olefinic.

The fact that lower molecular weight normal alkanes (or alkenes) are more highly retained at equilibrium than higher molecular weight normal alkanes (or alkenes) in a 5 Angstrom molecular sieve, should not be confused with the observation that a 4 Angstrom sieve will accept ethane but reject propane, for the action here is a mechanical blocking by the sieve against the entrance of $C_3$ and higher normal hydrocarbons by the small channels of the 4 Angstrom sieve lattice. In the case of the present phenomenon, all normal hydrocarbons are accepted by the 5 Angstrom sieve lattice, up to at least $C_{28}$, and the relatively higher retention at equilibrium, of lower molecular weight hydrocarbons is not a matter of mechanical blocking but is, presumably, a function of physical or chemical properties of the sieve lattice and/or the normal hydrocarbons, which properties are exhibited only after the hydrocarbon molecules are within the sieve lattice.

It is apparent from Table 1 that the preference of the 5 Angstrom lattice for lower molecular weight normal hydrocarbons is only relative and not absolute. Nevertheless, as will be shown herein below, this relative preference is controlling in processes for hydrocarbon separations in liquid phase employing molecular sieves having a pore diameter of about 5 Angstroms.

It is a very well known operating principle in adsorption practice, for example with silica gel, activated charcoal or the like, to make use of the law of mass action to displace a more strongly held material from an adsorbent by use of a large excess of a strippant or desorbant consisting of a less strongly held material, preferably boiling outside (above or below) the boiling range of the original feed mixture, to facilitate subsequent separation of the strongly held material from its solution in the strippant. Such processes are disclosed, for example (U.S. Patents Nos. 2,614,133 and 2,459,442), for cyclic adsorption systems employing silica gel. It is characteristic of such processes that all molecular types are present in the random-sized, but relatively large microcells of the silica, and that separation depends only on the fact that some molecular types (e.g., aromatics) are more strongly held in microcells of the adsorbent, and on the use of a less strongly held strippant (e.g., a normal alkane) boiling either above or below the boiling point of the strongly held molecular species.

The process of the present invention differs from conventional adsorption processes in that certain components of a feed mixture (for example, toluene and isohexane from their admixture with normal hexane and heptane) are not adsorbed at all by 5 A. molecular sieves, and yet it may be, and often is, desirable to recover these materials at high purity. According to the process of the present invention, such nonadsorbed components can only be recovered at maximum purity if the strippant or desorbant is an adsorbed material (e.g., normal dodecane in the above example) of higher molecular weight than the adsorbed materials in the feed.

A further manner in which the process of the present invention differs from conventional processes lies in the fact that when more than one component of a feed mixture (for example n-hexane and n-hexene from their admixture with toluene) is adsorbed in the molecular sieve, and it is required to recover these adsorbed materials at maximum purity, this can only be accomplished by using a sweep or "push" liquid of nonadsorbed molecular type (e.g., cumene in the example of this paragraph) in addition to the use of a higher molecular weight strippant (e.g., n-dodecane) for recovery of the adsorbed n-alkane component of the feed (n-hexane in the present example), and a higher molecular weight strippant (e.g., n-dodecene) for the adsorbed n-alkene component of the feed (n-hexene in the present example). The function of the "push" liquid is to clear the interstices between the particles of the molecular sieve of feed composition materials at the end of a feed cycle. The "push" liquid should have a boiling point above or below the feed boiling points to facilitate separation by distillation. In the example of the present paragraph, it was selected to boil at a temperature intermediate the feed and the strippants, to permit separation by distillation from either. The function of the strippants is as in the preceding paragraph.

The use of specific compounds in the preceding paragraphs is exemplary only, and is not intended to limit the scope of the present invention in any way.

Speaking generally, the present invention is based on the discovery that the objects stated hereinabove can be accomplished, with normal alkanes and/or normal alkenes being readily and substantially completely separated from mixtures thereof with branched chain hydrocarbons and/or cyclic hydrocarbons, including aromatics, by a cyclic operation conducted under essentially equilibrium conditions wherein the liquid mixture is passed through an aluminum silicate, molecular sieve adsorbent, and wherein the liquid phase desorption is effected by passing through the adsorbent a straight chain hydrocarbon which is higher boiling than any component of the feed. In this fashion, it has been found that not only can the adsorbed liquid be readily displaced from the sieve by the desorbing liquid, but in the subsequent adsorption step it is possible to effect a complete separation of the nonadsorbed hydrocarbons and/or the less readily adsorbed hydrocarbons in the feed while simultaneously displacing the higher molecular weight, straight chain hydrocarbons from the sieve. It has further been found that normal alkanes and normal alkenes may be readily and substantially completely separated from each other and from mixtures thereof with branched chain hydrocarbons and/or cyclic hydrocarbons, including aromatics, by cyclic operations, wherein the liquid mixture is passed through an aluminum silicate, molecular sieve adsorbent, and wherein liquid phase desorption of the normal alkene is effected in a first stage by passing through the adsorbent a straight chain olefin which is higher boiling than any component of the feed, subsequent to freeing the interstices between the particles of absorbent from approximately feed composition components by use of a nonadsorbed hydrocarbon "push" liquid which is different in boiling point than any component of the feed and than the straight chain olefin desorbent; and wherein the n-alkene-free and desorbent-free effluent from the first stage is passed through a second stage of molecular sieve adsorbent, and wherein liquid phase desorption of the normal alkane is effected by passing through the adsorbent a straight chain paraffin which is higher boiling than any component of the feed, subsequent to freeing the interstices between the particles of adsorbent from approximately feed composition components by means of a nonadsorbed hydrocarbon "push" liquid which is different in boiling point than any component of the feed, and than the straight chain paraffin desorbent.

The process of the invention can be applied to the separation of a wide variety of hydrocarbon liquids. For example, hydroformates can be improved in octane number by removal of straight chain paraffins, n-heptane can be separated from a straight run gasoline fraction with the same objective, and n-butane can be recovered from the products for recycle to a butane isomerization process. The freezing point of fuels for jet engines can be lowered by removal of contained n-paraffins, off-test medicinal paraffin oil can be declouded, gas oils dewaxed, and n-paraffins and n-olefins separated for feed to a dehydrocyclization process. The process is particularly useful for hydrocarbon mixtures containing hydrocarbons of different classes but boiling very nearly at the same temperature, and thus difficult to separate by distillation. For example, with a mixture of n-heptane, isooctane, and toluene, it would be very difficult to separate the n-heptane from isooctane from distillation; whereas, by the present process the high octane number components of the mixture (isooctane and toluene) are readily segregated from the low octane number component, normal heptane.

The molecular sieve adsorbents useful for the process of the present invention include natural and synthetic chabazite, as mentioned above, and the Linde Type 5A molecular sieve, a synthetic aluminum silicate produced by the Linde Air Products Company. The preferred material has about 5 Angstrom pore diameter (although this dimension could theoretically vary, as shown hereinabove, between about 4.9 and 5.5 Angstroms) and is in particulate form (granules or extruded particles and the like).

When processing feed stocks under conditions that one straight chain hydrocarbon displaces another straight chain hydrocarbon from the sieve, it is desirable to attain rapid diffusion in the sieve, as disclosed herein, and it has been found that such diffusion can be obtained by operating at elevated temperatures and at pressures such that the hydrocarbons are in liquid phase. Generally, with hydrocarbons of gasoline boiling range, temperatures between 100° F. and 500° F. can be used. The velocity of sorption is also increased by finely dividing the particles of sorbent, 20–60 mesh being a suitable choice for the gasoline boiling range of hydrocarbons when using fixed bed adsorbent masses.

As stated above, an effluent from a molecular sieve-type adsorbent containing the nonadsorbed and/or less readily adsorbed types of feed hydrocarbons with minimum content of the more readily adsorbed straight chain hydrocarbons in the feed is obtained by choosing as regenerating liquid a straight chain hydrocarbon higher boiling than any component of the feed. Broadly, straight chain hydrocarbons at least as high as $C_{28}$ may be employed as the regenerating liquid, with the limiting factor being viscosity and the rate of diffusion at the higher molecular weights. Preferably, for ease of separation, the regenerating liquid should boil at least 15° F. above the end point of the feed. Further, the regenerating liquid should preferably not contain hydrocarbons with more than 16 carbon atoms, because above this molecular weight the capacity of molecular sieve adsorbents begins to fall off. Because molecular sieves, in common with other adsorbent materials, preferentially adsorb olefins with respect to paraffins, it will generally be preferable when separating normal olefins from normal paraffins, whether or not admixed with hydrocarbons not adsorbed on the molecular sieve employed, to employ as regenerating liquid a normal olefin of higher molecular weight than any olefin feed component. Correspondingly, high molecular paraffins are preferred for separating low molecular weight paraffins.

The manner in which the present process is operated will be fully understood by the following description when read with reference to the appended drawings wherein FIGURE 1 is a diagrammatic illustration of a process flow suitable for the practice of the invention; FIGURES 2, 3, 4, and 5 are graphical illustrations of the composition of the effluent liquid from an adsorbent mass during feed and regeneration cycles employing a regeneration liquid higher boiling than the feed, while FIGURE 6, which is not illustrative of the invention, presents comparative data with respect to a lower boiling regenerating liquid.

Referring now to FIGURE 1 of the attached drawings, the adsorbent mass 1, together with pertinent lines, tanks, and stills, constitutes a normal olefin separation and recovery stage, the olefin being normal heptene in this example. Adsorbent mass 101, together with pertinent lines, tanks, and stills, constitutes a normal paraffin and aromatic separation and recovery stage, the paraffin and aromatic being normal heptane and toluene, respectively, in this example.

The adsorbent mass, made up of 20 to 60 mesh Linde Type 5A molecular sieve, is initially in regenerated state with, for example, normal dodecene as both the adsorbed hydrocarbon and the interstitial liquid between the adsorbent particles. A feed composed, for example, of 10 volume percent normal heptene, 10 volume percent normal heptane, and 80 volume percent toluene is fed continuously from tank 2 through line 3 into the adsorbent mass 1. During the first part of the feed cycle a first effluent consisting of substantially pure regeneration liquid (normal dodecene), is displaced by piston action of the feed, flows through line 4 into tank 5 where it is stored for use in a later regeneration cycle. As the feed flows through the adsorbent mass, the portion of the bed nearest the feed inlet becomes saturated with normal heptene and the interstitial liquid is of feed composition. Further along the direction of flow, the interstitial liquid is free of normal heptene, consisting now of normal heptane and toluene together with a minor amount of dodecene, and the adsorbed phase consists of normal heptene together with normal dodecene. While normal heptane is selectively sorbed in the presence of normal dodecene, the degree of selectivity is not as great as in the case of completely paraffinic or completely olefinic systems. Therefore, the interstitial liquid in the foregoing range does not become completely free of normal heptane, so that a mixture of toluene and dodecene as interstitial liquid is not secured. Thus the second effluent from the adsorbent mass 1 is a mixture of toluene, normal heptane, and dodecene, and flows via line 6 to surge tank 7, and thence via line 8 to conventional distillation column 9. In column 9 the second effluent is separated into an overhead stream of normal heptane and toluene which flows through line 10 to tank 11 where it is stored for subsequent processing described hereinbelow, and into a bottoms stream of dodecene which flows by way of line 12 to tank 5 for subsequent reuse.

The third and final effluent during the feed cycle begins at about the time when normal heptene first appears in the outlet stream and ends when the stream reaches approximate feed composition. This third effluent flows via line 13 to tank 14 where it is stored for use at the start of the next feed cycle, since it is partly enriched in toluene and normal heptane.

The adsorbent mass may be regenerated in various ways, one of which is to charge normal dodecene as regenerant and then to segregate the following cuts in order: (a) feed composition liquid, (b) feed composition liquid containing regenerating liquid, (c) regenerating liquid containing feed hydrocarbons enriched in normal olefins. The latter stream is then reprocessed to effect further segregation of normal olefins. However, for recovery of n-olefin of maximum purity in the minimum number of cycles, it is preferred to interpose between the feed cycle and the regenerating cycle a quantity of aromatic or other nonadsorbed hydrocarbon, with a boiling point sufficiently different from dodecene and the feed components to permit separation by distillation. As applied to the hydrocarbon mixture of the present example, a satisfactory choice is about 0.5 to 1.0 volume of cumene per volume of fresh feed previously charged to the column. After the cumene has been charged from tank 16 through line 17, dodecene is fed from tank 5 through line 23 to the same end of bed 1 where the cumene was added. Under these circumstances the first effluent from the adsorbent mass during the regeneration cycle consists of approximately feed composition liquid and flows via line 18 to tank 2 containing feed for the next feed cycle.

The second effluent consists of cumene together with feed components and flows by way of line 19 to conventional still 20. In still 20 feed components were recovered and flow via line 21 to tank 2 containing feed for the next feed cycle. Recovered cumene flows by way of line 22 to tank 16 for use in the next regeneration cycle. With the amount of cumene specified hereinabove, feed components will disappear from the second effluent prior to the appearance of dodecene. The third effluent during the regeneration cycle is a mixture of normal dodecene, cumene, and normal heptene displaced from the molecular sieve by dodecene. The third effluent flows via line 24 to conventional distillation column 25, where n-heptene product is recovered through line 26 and stored in tank 27. The bottoms from still 25, consisting of a mixture of cumene and dodecene, flows, by way of line 28 to still 29, where cumene is recovered overhead through line 30, and stored in tank 16 for reuse, and n-dodecene is recovered through line 31, and stored in tank 5 for reuse. The next feed cycle is initiated by feeding partially separated stock from tank 14 through line 15 to adsorbent mass 1, followed by fresh feed from tank 2 through line 3. With the initiation of the feed cycle, the series of operations repeats as described herein above.

The adsorbent mass 101 made up of 20 to 60 mesh Linde Type 5A molecular sieve is initially in regenerated state with, for example, normal dodecane as both the adsorbed hydrocarbon and the interstitial liquid. The feed composed of normal heptane and toluene effluent from the normal heptene recovery stage and stored in tank 11 is fed continuously through line 103 into the adsorbent mass 101. During the first part of the feed cycle, a first effluent consisting of pure regeneration liquid (normal dodecane) displaced by piston action of the feed, flows through line 104 into tank 105 where it is stored for use in a later regeneration cycle. As the feed flows through the adsorbent mass, the portion of the bed nearest the feed inlet becomes saturated with normal heptane and the interstitial liquid is of feed composition; further along in the direction of flow, because normal heptane is adsorbed preferentially over normal dodecane and tends to displace it, the interstitial, liquid is free of normal heptane consisting now of toluene and a minor amount of dodecane. Thus, the second effluent from the adsorbent mass 101 is a mixture of toluene and dodecane and flows via line 106 to surge tank 107, and thence via line 108 to conventional distillation column 109. In column 109 the second effluent is separated into an overhead stream of toluene which flows through line 110 to product tank 111, and into a bottoms stream of dodecane which flows by way of line 112 to tank 105 for subsequent reuse. The third effluent during the feed cycle begins at a time when the adsorbent mass is nearly saturated with normal heptane so that the latter first appears in the outlet stream and ends when the stream reaches approximate feed composition. This third effluent flows via line 113 to tank 114 where it is stored for use at the start of the next feed cycle, since it is partly enriched in toluene.

Just as in the normal heptene recovery cycle, the adsorbent mass may be regenerated in various ways, one of which is to charge normal dodecane as regenerant and then to segregate the following cuts in order: (a) feed composition liquid, (b) feed composition liquid composition containing regenerating liquid, (c) regenerating liquid containing the feed hydrocarbons toluene and normal heptane but enriched in normal heptane. The latter stream may then be further processed to increase its normal heptane content, or discarded if the normal paraffin lacks value. However, if it is desired to recover normal feed paraffin of maximum purity in the minimum number of cycles, it is preferred to interpose between the feed cycle and the regenerating cycle a quantity of aromatic or other nonadsorbed hydrocarbon, with a boiling point sufficiently different from dodecane and the feed components to permit separation by distillation. As applied to the hydrocarbon mixture of the present example, a satisfactory choice is about 0.5 to 1.0 volume of cumene per volume of feed previously charged to adsorbent mass 101. After the cumene has been charged from tank 116 through line 117, dodecane is fed from tank 105 through line 123 to the same end of bed 101 as where the cumene was added. Under these circumstances the first effluent from the adsorbent mass 101 during the regeneration cycle consists of feed composition liquid and flows via line 118 to tank 11 containing feed for the next feed cycle of bed 101. The second effluent consists of cumene together with feed components and flows by way of line 119 to conventional still 120. In still 120 feed components are recovered and flow via line 121 to tank 11 containing feed for the next feed cycle. Recovered cumene flows by way of line 122 to tank 116 for use in the next regeneration cycle. With the amount of cumene specified hereinabove, feed components will disappear from the second effluent prior to the appearance of dodecane. The third effluent flows via line 124 to conventional distillation column 125, where normal heptane product is recovered through line 126 and stored in tank 127. The bottoms from still 125, consisting of a mixture of cumene and dodecane flows by way of line 128 to still 129, where cumene is recovered overhead through line 130 and stored in tank 116 for reuse, and n-dodecane is recovered through line 131 and stored in tank 105 for reuse. The next feed cycle is initiated by feeding partially separated stock from tank 114 through line 115 to adsorbent mass 101, followed by feed from tank 11 through line 103. With the initiation of the feed cycle, the series of operations repeats as described hereinabove.

Figure 2:
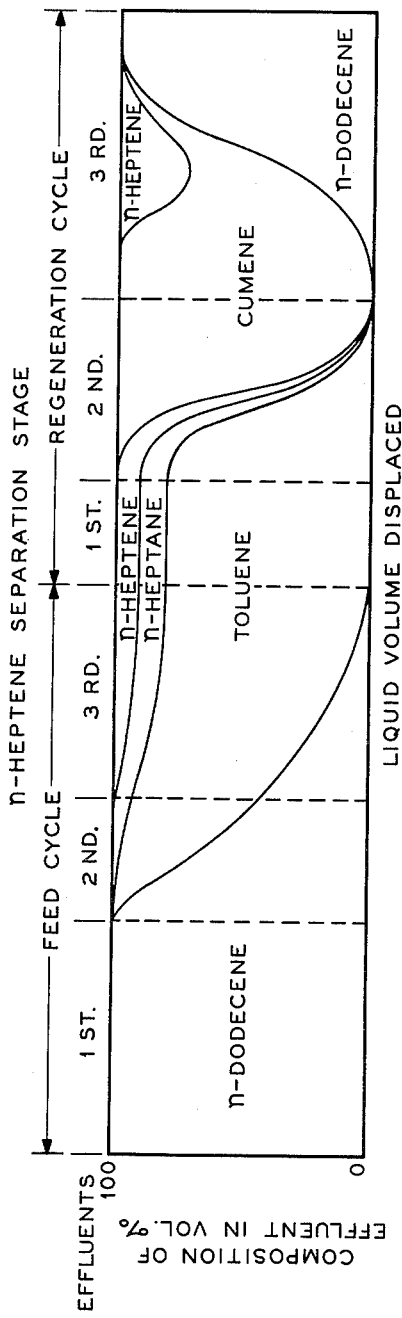
Figure 3:
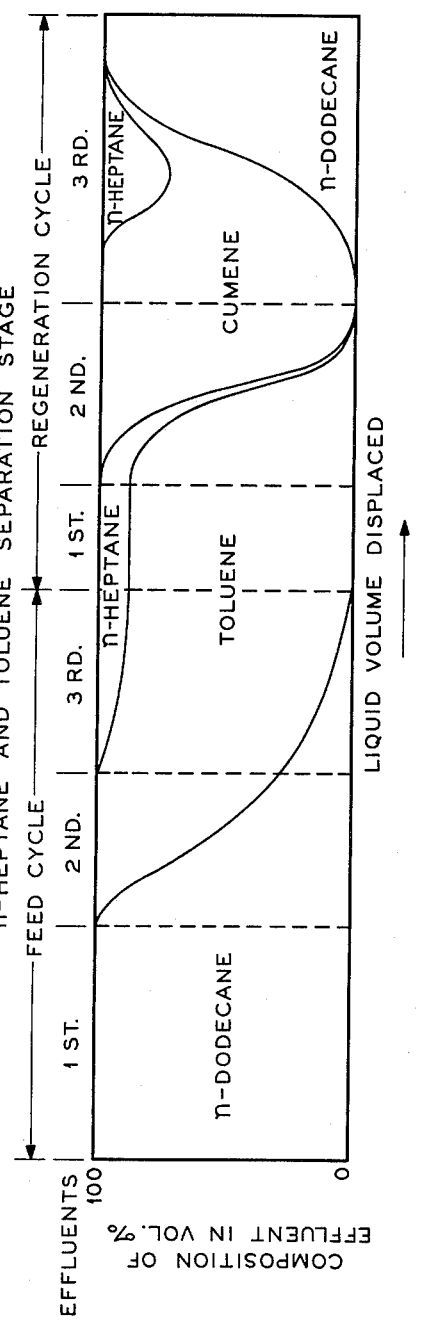

FIGURE 2 and FIGURE 3 of the appended drawings show diagrammatically the cycle illustrated by FIGURE 1 and described hereinabove. In FIGURE 2 and FIGURE 3 the composition of the effluents from the molecular sieve beds are plotted versus the volume of feed, FIGURE 2 referring to the n-heptene separation stage of FIGURE 1, and FIGURE 3 to the n-heptane and toluene separation stage of FIGURE 1. In both cases the feed and regeneration cycles are indicated, as well as the composition of the various effluents from each cycle.

Figure 4:
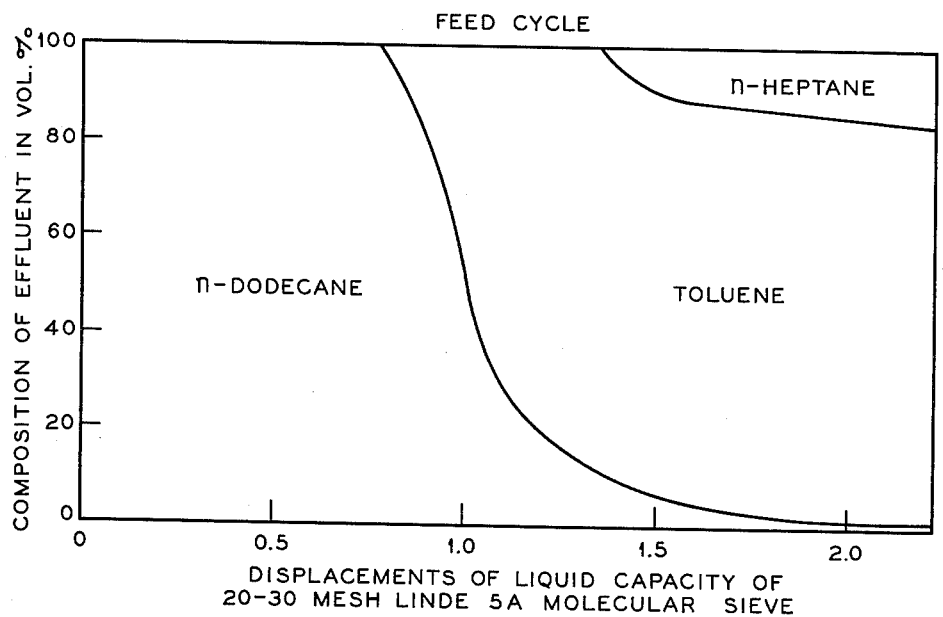

FIGURE 4 of the appended drawings shows the results obtained in a feed cycle charging a mixture of 16.5% n-heptane in toluene to an adsorbent mass which was originally full of n-dodecane. The adsorbent mass consisted of 497 grams of 20–60 mesh Linde Type 5A molecular sieve contained in a steam-jacketed glass column which was 2.5 cm. in internal diameter and 151 cm. long. The temperature of the column and contents was maintained at 210° F. during the run to increase rate of diffusion. Liquid feed was pumped to the bottom at the rate of 1.6 ml. per minute, corresponding to about 4.9 gallons per hour per square foot of column cross-sectional area in a commercial sized unit. The characteristics of the adsorbent were such that 100 grams contained 15.5 ml. of pore volume determined for n-heptane, that is, volume within the adsorbent particles, and 93.0 ml. of void volume, that is, interstitial volume between the particles. The sum of the void and pore volumes, 108.5 ml. per 100 grams of adsorbent, represents the liquid capacity of the adsorbent, and the amount of liquid which must be displaced in a continuous liquid flow process. The ordinate in FIGURE 4 represents the composition in volume percent of the liquid effluent from the top of the adsorbent mass. The abscissa represents the amount of liquid effluent in terms of the number of displacements of the liquid capacity of the adsorbent. Because the column was charged with liquid feed at a constant rate, the abscissa may also be regarded as a uniform time scale. Following the axis of abscissa in FIGURE 4, from left to right, it will be noted that the first effluent from the top of the adsorbent mass consisted of pure dodecane, and that pure dodecane continued to flow from the mass until an amount of feed mixture corresponding to the fraction 0.8 of the liquid capacity of the mass had been charged. At this point toluene began to appear together with dodecane in the effluent and continued to flow, free of n-heptane, while dodecane gradually decreased in relative amount. After about 1.4 displacements of liquid capacity by feed mixture had been made, heptane appeared in the effluent, and from this point on to the end of the feed cycle at 2.2 displacements of liquid capacity the effluent gradually approached the feed mixture composition of n-heptane in toluene. Thus, there were three types of effluent: first, from 0 to 0.8 liquid displacements, liquid dodecane which could be segregated for subsequent reuse; second, from 0.8 to 1.4 displacements, a mixture of toluene and dodecane readily separable by distillation; third, from 1.4 to 2.2 displacements, a small amount of dodecane together with a much larger quantity of a mixture of heptane in toluene, somewhat lower in heptane content than fresh feed and thus partially refined, which could be fed first the next feed cycle.

Figure 5:
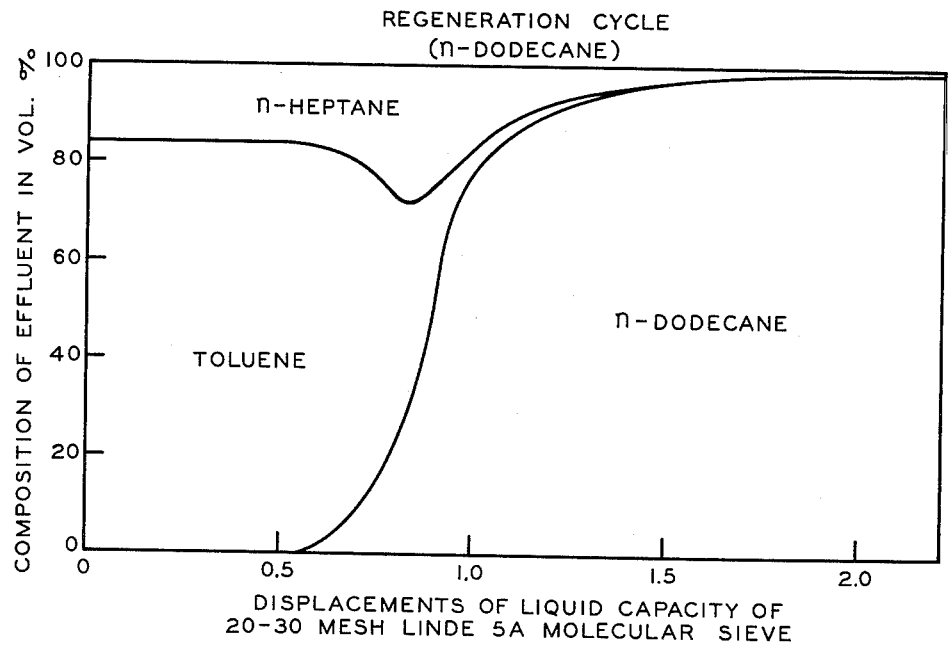

FIGURE 5 shows the results of a regeneration cycle in which normal dodecane was fed to the adsorbent mass downflow as a regenerating liquid following the feed cycle shown in FIGURE 4. It will be noted that the effluent from the adsorbent consisted of feed composition liquid up to about 0.6 liquid displacements, which feed liquid could be segregated for reuse. From this point on, displacement was continued until at the end of the cycle the effluent was substantially pure dodecane. The effluent during this latter period consisted of a mixture of a relatively large amount of dodecane together with a smaller amount of feed components richer in n-heptane than fresh feed, from which mixture the dodecane could be readily separated by distillation for reuse. The enrichment of the latter feed mixture in n-heptane was such that further cyclic processing as shown in FIGURES 4 and 5 would ultimately lead to segregation of substantially pure n-heptane if desired.

Figure 6:
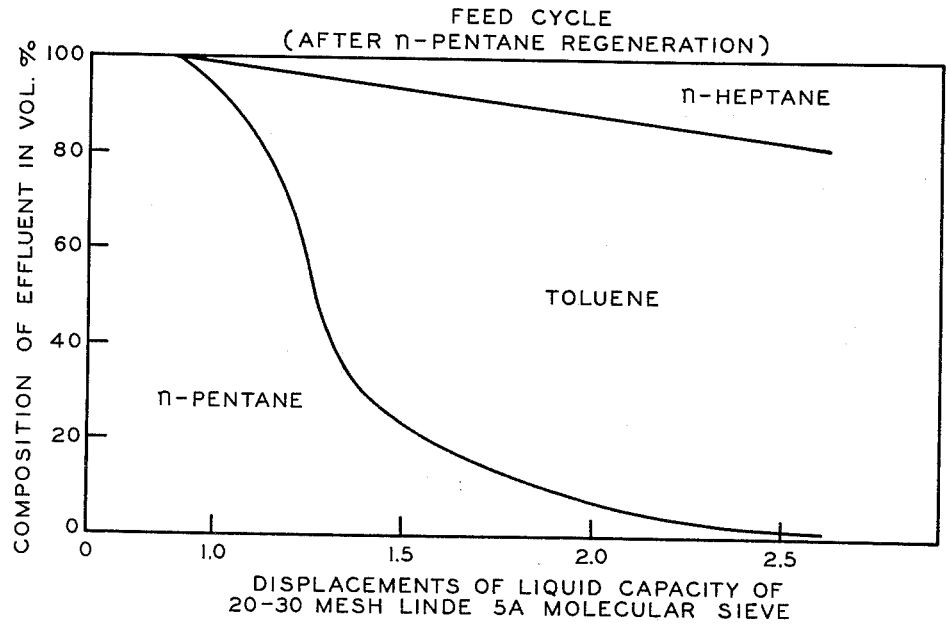

FIGURE 6 shows the composition of the effluent streams during a feed cycle processed with the same equipment and under the same conditions as before except that, contrary to the teaching of the present invention, the adsorbent mass was initially full of n-pentane, a straight chain paraffin of lower molecular weight than contained in the feed. It is apparent from the drawing that substantially no toluene free of n-heptane was produced. A small degree of concentration of aromatics is indicated by the fact that the proportion of heptane in the effluent (on a pentane-free basis) is somewhat less than in the fresh feed, between 0.9 and 2.5 displacements, and reaches a minimum of about 5% compared to 16.5% heptane in the feed. This is in contrast to the cycle of FIGURE 4 employing dodecane as regenerant, where the effluent contained essentially no heptane for about 0.6 of a liquid displacement, indicating much greater efficiency of separation.

While the process of the present invention has been described in terms of a batch operation employing a fixed bed of adsorbent particles, it may also be conducted with a plurality of fixed adsorbent beds in a cyclic continuous operation, or with a moving mass of adsorbent in a continuous operation.

In a cyclic liquid-phase adsorption separation a plurality of adsorbent masses are continuously interconnected and provided with suitable lines and valves to permit blocking liquid flow between adjoining masses and to allow external liquid streams to be added to or withdrawn from any mass. The masses are divided into two groups, one of these groups constituting an adsorption zone and the other a regeneration zone. In each group, flow is from the first terminal mass to the last terminal mass. In the adsorption zone a liquid feed is contacted with adsorbent to separate an adsorbate and a nonadsorbed percolate. In the regeneration zone the adsorbate separated in previous cycles is removed from the adsorbent by means of a regenerating liquid. In the course of a cycle of operation the capacity of the first terminal mass of the adsorption zone to effect further separation of the feed is exhausted, and the regeneration of the first terminal mass in the regeneration zone is completed. A new cycle is then initiated by altering the connecting lines so that the first terminal mass of the regeneration zone becomes the last terminal mass of the adsorption zone, and so that the first terminal mass of the adsorption zone becomes the last terminal mass of the regeneration zone in the new cycle.

In a continuous moving bed, liquid adsorption process the adsorbent flows, usually downwardly, through one or more columns in which it is countercurrently contacted successively with feed and regenerating liquid. The zones of contact with feed and regenerating liquid may be in separate columns for ease of operation, and correspond respectively to the adsorption and regeneration zones of the cyclic system described hereinabove. Inlet and outlet connections to the columns for flow of feed, percolate, regenerating liquid, and adsorbate streams are provided in correspondence to the cyclic system. The adsorbent may be transferred from the base of one column to the top of the next by means of a mechanical lift, for example.

I claim:

1. In a process for separating normal straight chain hydrocarbons selected from the group consisting of straight chain paraffins and straight chain olefins from a hydrocarbon feed mixture containing said hydrocarbons along with non-straight chain hydrocarbons, the steps comprising passing said mixture in liquid phase through a bed of molecular sieve adsorbent adapted to selectively adsorb said straight chain hydrocarbons; thereafter stripping adsorbed and non-adsorbed feed hydrocarbons from the bed by passing therethrough an excess of a strippant liquid consisting essentially of straight chain hydrocarbons which have the same degree of unsaturation per molecule as the adsorbed component of the feed and are higher boiling than any component of the feed; and displacing the strippant liquid from the bed by resuming passage therethrough of the hydrocarbon feed mixture, the straight chain component in said mixture being preferentially adsorbed in the bed and thus displacing the adsorbed portion of the said higher boiling straight chain hydrocarbon component of the strippant liquid.

2. In a process for separating normal olefins from a hydrocarbon feed mixture containing said olefins along with normal paraffins and non-straight chain hydrocarbons, the steps of passing said mixture in liquid phase through a bed of molecular sieve adsorbent adapted to selectively adsorb said normal olefins; thereafter stripping adsorbed and non-adsorbed feed hydrocarbons from the bed by passing therethrough an excess of a straight chain olefin strippant which is higher boiling than any component of the feed; and again resuming passage through the bed of the hydrocarbon feed mixture, the straight chain olefins in said mixture being preferentially adsorbed in the bed and thus displacing therefrom the said higher boiling, straight chain olefin strippant.

3. In a process for separating normal olefins from hydrocarbon feed mixtures containing said olefins along with normal paraffins and non-straight chain hydrocarbons, the steps comprising passing said mixture in liquid phase through a bed of molecular sieve adsorbent adapted to selectively adsorb said normal olefins; passing through the bed as a first strippant liquid a liquid hydrocarbon with a boiling point materially different from that of any component of the feed hydrocarbon mixture and which is not adsorbed by said bed, said non-adsorbed liquid acting to displace non-adsorbed feed liquid components present in the bed; thereafter passing through the bed as a second strippant liquid an excess of a straight chain olefin which is higher boiling than any component of the feed hydrocarbon mixture and has a boiling point which is materially different from that of the first strippant, said second strippant liquid acting to strip from the bed adsorbed and non-adsorbed hydrocarbons present therein; and displacing said second strippant liquid from the bed by again resuming passage therethrough of the hydrocarbon feed mixture, the straight chain olefin component of said mixture being preferentially adsorbed in the bed and thus displacing the adsorbed second strippant liquid of the bed.

4. In a process for separating normal paraffins from a hydrocarbon feed mixture containing said paraffins along with non-straight chain hydrocarbons, the steps comprising passing said feed mixture in liquid phase through a bed of molecular sieve adsorbent adapted to selectively adsorb said normal paraffins; thereafter stripping adsorbed and non-adsorbed feed hydrocarbons from the bed by passing therethrough an excess of a liquid normal paraffin strippant which is higher boiling than any component of the feed mixture; and displacing the strippant liquid from the bed by resuming passage therethrough of the liquid feed mixture, the normal paraffin component in said mixture being preferentially adsorbed in the bed and thus displacing the higher boiling normal paraffin strippant from the bed.

5. In a process for separating normal paraffins from a hydrocarbon feed mixture containing said paraffins along with non-straight chain hydrocarbons, the steps comprising passing said mixture in liquid phase through a bed of molecular sieve adsorbent adapted to selectively adsorb said normal paraffins; passing through the bed as a first strippant liquid an excess of a liquid hydrocarbon with a boiling point materially different from that of any component of the feed hydrocarbon mixture and which is not adsorbed by said bed, said non-adsorbed liquid acting to displace non-adsorbed feed liquid components present in the bed; thereafter passing through the bed an excess of a second strippant liquid comprising a normal paraffin which is higher boiling than any component of the feed mixture and which has a boiling point which is materially different from that of the first strippant liquid, said second strippant liquid acting to strip adsorbed and non-adsorbed hydrocarbons from the bed; and displacing the said second strippant liquid from the bed by resuming passage therethrough of the liquid feed mixture, the normal paraffin component in said mixture being preferentially adsorbed in the bed and thus displacing the adsorbed higher boiling, normal paraffin strippant from the bed.

6. In a cyclic process for separating normal olefins and normal paraffins from a hydrocarbon feed mixture containing said normal hydrocarbons along with non-straight chain hydrocarbons, the steps comprising passing said feed mixture in liquid phase through a first bed of molecular sieve adsorbent adapted to selectively adsorb said normal olefins while yielding as intermediate product a hydrocarbon stream depleted in normal olefin components; passing through the said normal olefin-enriched, first bed a first displacing medium comprising a liquid hydrocarbon with a boiling point materially different from that of any component of the feed hydrocarbon mixture and which is not adsorbed by that bed, said non-adsorbed liquid acting to displace a hydrocarbon stream of essentially feed composition; thereafter passing through said first bed an excess of a second displacing liquid comprising a normal olefin which is higher boiling than any component of the feed hydrocarbon mixture and which has a boiling point materially different from that of the first displacing medium, said olefinic displacing liquid acting to strip from the bed both adsorbed and non-adsorbed hydrocarbons present therein; displacing said second displacing liquid from the bed by resuming passage therethrough of the liquid hydrocarbon feed mixture, the normal olefins contained in said mixture being preferentially adsorbed in the bed and thus displacing the adsorbed portion of the said higher boiling, normal olefin component of the second displacing liquid; passing the intermediate product stream from the first bed through a second bed of molecular sieve adsorbent adapted to adsorb normal paraffins present in the stream; passing through the said normal paraffin-enriched second bed a first displacing medium comprising a liquid hydrocarbon with a boiling point materially different from that of any component of the feed hydrocarbon mixture and which is not adsorbed by said bed, said non-adsorbed liquid acting to displace non-adsorbed feed liquid components present in the bed; thereafter passing through said second bed an excess of a second displacing liquid comprising a normal paraffin which is higher boiling than any component of the feed mixture and which has a boiling point materially different from that of the first displacing medium employed in said second bed, said paraffinic displacing liquid acting to strip from the bed both adsorbed and non-adsorbed hydrocarbons present therein; and displacing said paraffinic displacing liquid from the second bed by resuming passage therethrough of the liquid, intermediate product stream from the first adsorbent bed, the normal paraffin component of said intermediate product stream being preferentially adsorbed and thus displacing the adsorbed portion of the higher boiling, normal paraffin component of said paraffinic displacing liquid.

References Cited in the file of this patent

UNITED STATES PATENTS

| | | |
|---|---|---|
| 2,487,804 | Hermanson | Nov. 15, 1949 |
| 2,818,449 | Christensen et al. | Dec. 31, 1957 |
| 2,818,455 | Ballard et al. | Dec. 31, 1957 |
| 2,850,549 | Ray | Sept. 2, 1958 |
| 2,859,256 | Hess et al. | Nov. 4, 1958 |
| 2,886,509 | Christensen et al. | May 12, 1959 |
| 2,912,473 | Hutchings | Nov. 10, 1959 |
| 2,914,591 | Brown | Nov. 24, 1959 |
| 2,920,037 | Haensel | Jan. 5, 1960 |
| 2,935,467 | Fleck et al. | May 3, 1960 |

OTHER REFERENCES

"Examine These Ways to Use Selective Adsorption," Petroleum Refiner, vol. 36, No. 7, July 1957, pp. 136–140 (pp. 136–7 only relied on).

UNITED STATES PATENT OFFICE
CERTIFICATE OF CORRECTION

Patent No. 3,054,838                          September 18, 1962

Clark J. Egan

It is hereby certified that error appears in the above numbered patent requiring correction and that the said Letters Patent should read as corrected below.

Column 6, line 3, for "from", second occurrence, read -- by --; column 8, line 40, after "interstitial" strike out the comma; column 12, line 31, strike out "an excess of"; lines 36 and 37, strike out "an excess of" and insert instead -- as --; same column 12, line 37, for "comprising" read -- an excess of --.

Signed and sealed this 25th day of June 1963.

(SEAL)
Attest:

ERNEST W. SWIDER
Attesting Officer

DAVID L. LADD
Commissioner of Patents